United States Patent [19]

Zimmerman

[11] 4,054,927
[45] Oct. 18, 1977

[54] TELEPHONE ANSWERING APPARATUS WITH CONTROL IN RESPONSE TO SEGMENT OF THE ENDLESS TAPE LOOP

[75] Inventor: Joseph J. Zimmerman, Elm Grove, Wis.

[73] Assignee: GTE Automatic Electric Laboratories Incorporated, Northlake, Ill.

[21] Appl. No.: 644,222

[22] Filed: Dec. 24, 1975

[51] Int. Cl.² .................... G11B 15/06; G11B 15/44; G11B 15/52
[52] U.S. Cl. .................... 360/74; 179/6 R; 360/72; 360/73; 250/570
[58] Field of Search ............... 360/74, 71–73, 360/90, 62; 179/6 R, 100.1 DR; 226/24, 43, 45; 250/570–571

[56] References Cited

U.S. PATENT DOCUMENTS

| | | | |
|---|---|---|---|
| 3,281,039 | 10/1966 | Foley | 360/90 |
| 3,423,743 | 1/1969 | Silverman | 360/72 |
| 3,566,132 | 2/1971 | Walker | 360/74 |
| 3,573,393 | 4/1971 | Blackie et al. | 360/72 |
| 3,614,453 | 10/1971 | Johnson | 360/74 |
| 3,731,008 | 5/1973 | Meri | 360/74 |
| 3,780,226 | 12/1973 | Jacobson | 179/6 R |
| 3,953,679 | 4/1976 | Buglewicz | 179/6 R |

*Primary Examiner*—Alfred H. Eddleman
*Attorney, Agent, or Firm*—Robert J. Black

[57] ABSTRACT

A telephone answering and recording device employing an endless tape loop on the announcement and incoming message recording media. Switching from announce to record modes occurs in response to a transparent window or reflective segment included in the tape.

11 Claims, 5 Drawing Figures

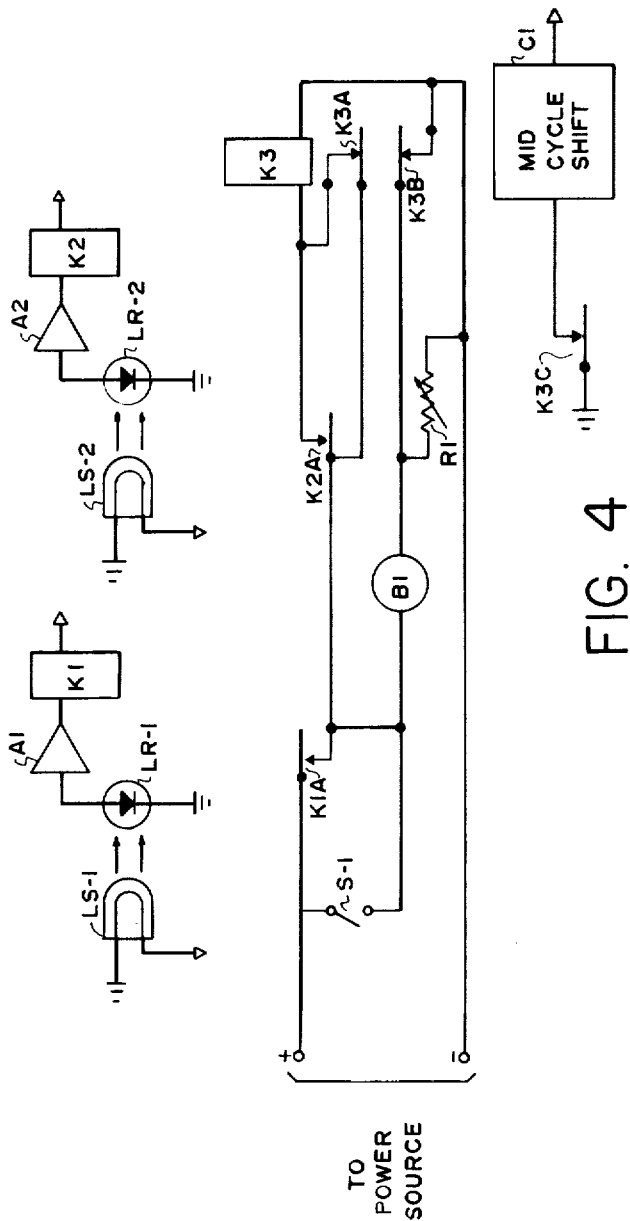
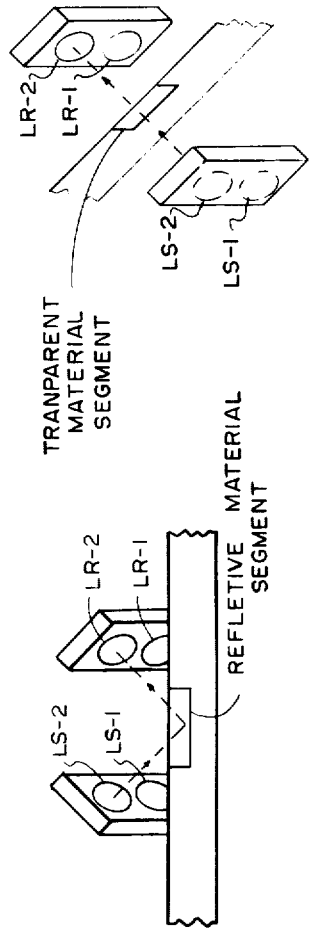
FIG. 4
FIG. 3B
FIG. 3A

TELEPHONE ANSWERING APPARATUS WITH CONTROL IN RESPONSE TO SEGMENT OF THE ENDLESS TAPE LOOP

BACKGROUND OF THE INVENTION

1. Field of the Invention

The present invention relates to devices for processing information on tape and more particularly relates to an improved telephone answering apparatus wherein no mechanical shifting occurs between transmission of a prerecorded announcement and recording of a callers message.

2. Description of the Prior Art

In recent years tape recording equipment has found a wide usage in a variety of different environments. Devices employing tape recording equipment have particularly gained wide-spread acceptance when employed as automatic telephone answering devices. With the use of such a device a salesman, who must be away from his office, can prerecord an announcement asking each caller to leave a message which may be stored by the device for playback when the salesman returns. In this way, no call gets unanswered.

A number of different arrangements have been used for recording both outgoing and incoming messages in such devices. Reels of tape, combinations of tape reels and magnetic recording discs and the use of so-called cassettes of magnetic recording tape have all been employed with varying degrees of success for this particular purpose. Naturally the use of several different techniques in the same device is possible and feasible but the complexity results in a unit that is less than economically attractive. A very inexpensive and straight forward approach is to employ a so-called endless loop of magnetic tape as the media upon which both outgoing and incoming messages may be recorded. Such devices naturally are limited by the amount of tape available and physical limitations of the device size preclude extensive length of magnetic tape being employed for this purpose. A telephone answering and recording apparatus employing an endless loop tape for the purpose of providing an answer-back message and employing an announcement tape in accordance with this technique is taught by U.S. Pat. No. 3,780,226 which issued in Sava W. Jacobson on Dec. 18, 1973. In this unit however, the incoming messages are recorded on a tape cassette even though a common drive mechanism is operative to provide the power for both the endless tape belt and for the cassette.

As noted however in such arrangements the size of the outgoing messages is determined by the size of the loop and naturally the size is often ineffective to provide sufficient media for recording of incoming messages. In order to hold the unit to convenient size, it is necessary to restrict the length of the loop size.. U.S. Pat. No. 3,281,039 which issued to Thomas P. Foley on Oct. 25, 1966 suggests an optional arrangement. An improved information processing device employing a magnetic tape loop is suggested wherein the effective usable tape surface is increased substantially without increasing the size of the overall device by employing a tape loop having magnetizable layers on two surfaces, along with a twisted configuration of the tape so that two complete revolutions of the tape are required to expose both surfaces to a magnetic read and write head. In this manner the effective tape surface available for recording and playback is doubled.

No technique however is taught in the Foley patent whereby switching is accomplished from one function to the other, that is to say from record to playback or vice versa. Accordingly it is the purpose of the present invention to provide a telephone answering and recording device which employs the economic advantages of a single or endless loop of tape as the recording media for both record and playback and provides a convenient means for switching from one function to the other.

SUMMARY OF THE INVENTION

The foregoing objective is achieved by providing a telephone answering apparatus wherein a single announcement is prerecorded on one surface of an endless tape loop and the second surface of the endless tape loop is employed for the recording of incoming messages. To facilitate the above, a tape drive mechanism if provided for driving the endless tape loop which is positioned in a manner whereby a half twist is made in the tape before joining the two ends together to form the endless loop. Also incorporated into both sides of the tape but extending for only a portion of the distance across the tape, is either a transparent window or light reflective segment, whose purpose shall be described hereinafter.

Positioned on the same support mechanism which the drive apparatus is included, is a combination recording and playback magnetic pickup head having electrical circuit connections to conventional recording and playback circuitry.

To provide the necessary control in the present invention, a pair of light sources are positioned on the same support mechanism and adjacent to each other as are a pair of light sensitive devices such as photo-diodes. Positioning is on the same support member in such a manner that light reflected or transmitted through a lower portion of the endless loop tape causes an electrical output from one of the photosensitive devices and light reflected from or through an upper portion of the tape is effective to cause an output to be generated from the other of the two light sensitive devices. It is these two light sensitive devices and their associated light sources that provide the necessary control signals which are employed for operation of control of the present device.

Assuming the device is manually or automatically placed in operation, such as might be the case in response to a telephone ringing signal, the endless tape loop will advance off a position wherein a signal is present at either light sensitive device and will operate to make one complete loop after which light will be reflected from or transmitted through the upper portion of the tape causing an output from the associated photosensitive device. Operation of this photosensitive device is effective to operate a relay which in turn will lock itself into an operated position. This relay will then provide the necessary operating circuits to a midcycle relay which will perform the usual midcycle functions of starting an incoming tape recorder and switch in a variable resistor in the motor supply circuit which provides the necessary drive for the tape mechanism of the present invention.

The inclusion of the resistor between the motor and its power supply increases the timing period or duration for recording of the incoming message thus the timing period can be extended, depending upon the value of the resistor, since the motor will shift into a lower speed at the time of the midcycle switching function. For example, the loop might set up to give a 20 second announcement before switching, then increase the incoming time allotment to 30 to 40 seconds. This resistor may be variable and accordingly can be used to reduce the voltage supply of the motor below the normal governed range to accomplish the increased time duration, thus the simple tape loop serves as an announcement recorder and an incoming message timer, obviating the need for electronic circuitry for this purpose.

BRIEF DESCRIPTION OF THE DRAWINGS

FIG. 3A and 3B are partial side views of a telephone answering apparatus in accordance with the present invention showing the manner in which two light sources and two light sensitive devices may be positioned relative to the tape media in accordance with the teachings of the present invention.

FIG. 4 is a partial schematic circuit diagram of a telephone answering apparatus in accordance with the present invention.

DESCRIPTION OF THE PREFERRED EMBODIMENT

Figure 1:
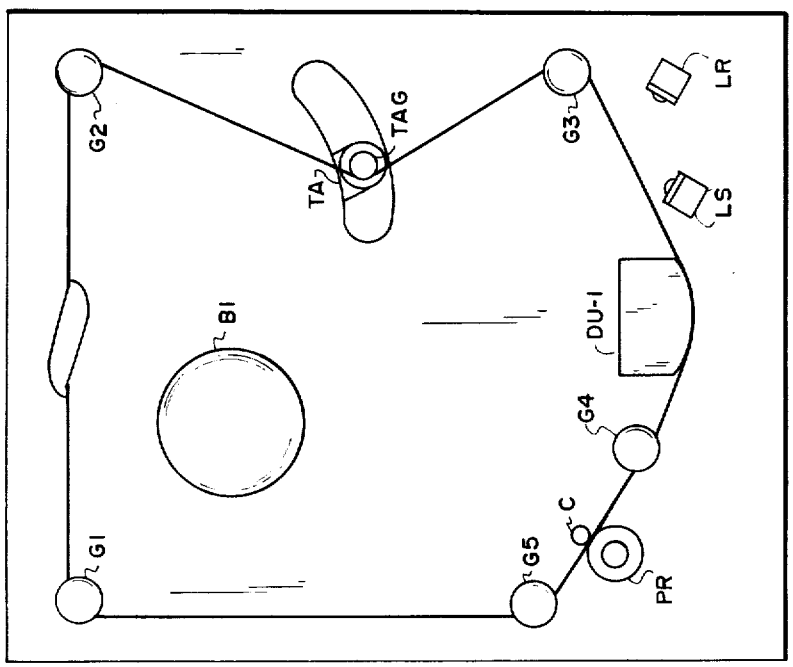
FIG. 1 is a top view of a telephone answering apparatus in accordance with the present invention.

An understanding of the present invention will be had by taking into consideration the following description in connection with the drawings. Referring first to FIG. 1, a drive motor B1 is positioned on a suitable mounting plate or base with the drive shaft mounted below the base as may be seen by reference to FIG. 2. Located on the upper surface of the base are a number of guide posts G1, G2, G3, G4 and G5 respectively, on which tape TP1 is positioned. As may be noted, tape TP1 includes a 180° twist or turn as may be noted between guides G1 and G2. A combination magnetic recording and playback head PU1 is positioned so that the tape surface of TP1 rides across its surface in a conventional manner. Drive for the tape is provided by capstan C which is kept in contact with the tape by means of pressure roller PR which may employ spring loading or other conventional technique to maintain a constant pressure against the tape placing it in contact with the driving capstan which in turn is rotated from below the base by a flywheel and pulley combination which may be seen by reference to FIG. 2. A constant pressure is also placed upon the tape TP1 by a guide TAG projecting upward from tension arm TA which is located below the base and projects upward through a slot in the base as may be observed.

Also included on the base as may be noted in FIG. 1, is a light source mounting LS in which are mounted in vertical relationship to each other light source LS1 and light source LS2. Also positioned in such a manner so that a reflective surface of the tape will reflect light from light source LS1 or light source LS2 onto their surfaces are two photosensitive devices LR1 and LR2 which are mounted in like vertical position in photosensitive device mounting LR.

Figure 2:
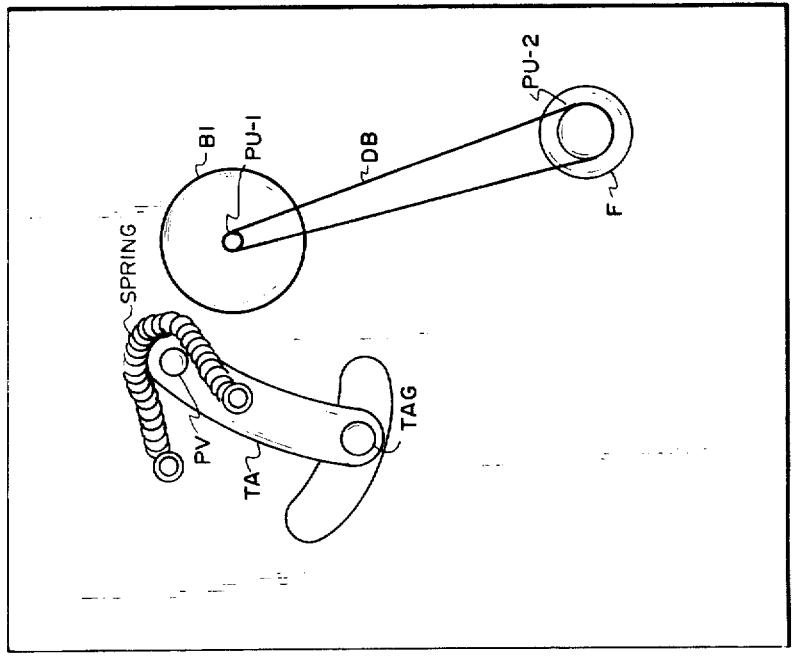
FIG. 2 is a bottom view of a telephone answering apparatus in accordance with the present invention.

By reference to FIG. 2 it will be noted that motor B1's drive shaft has mounted thereon a drive pulley PU1 connected by means of drive belt DB to a pulley PU2 which is directly connected to flywheel F. Flywheel F in turn is fastened to the lower end of capstan C which projects through the base to drive the tape as noted in FIG. 1.

As noted previously a tension arm guide seen in FIG. 1 projects through a slot in the base but is connected to the tension arm TA. Tension arm TA is pivoted at point PV and maintained under tension by coil spring S.

From the above it would be obvious that motor B1 drives flywheel F and capstan C so that pressure roller PR and capstan C will advance the tape. Then tension arm TA is biased by coil spring S to keep the tape at a constant pressure over the tape heads. As noted previously, it is possible to employ transparent windows in the tape rather than a reflective surface to provide the necessary control. In such an instance the light source mounting LS incorporating light sources LS1 and LS2 would be positioned on one side of tape TP with light sensitive device mounting LR incorporating light sensitive devices LR1 and LR2 positioned on the opposite side so that when a transparent window positioned in the tape between light source LS1 and light sensitive device LR1 is present, light will be conducted and an output generated by light sensitive device LR1. Likewise when the transparent window in the tape is positioned in such a manner that light is conducted from light source 2 to light sensitive device LR2 an output will be present from light sensitive device LR2.

As may be noted by referring to the attached schematic diagram, light sensitive devices LR1 and LR2 have been shown as photosensitive diodes while their associated light sources LS1 and LS2 have been shown as incadescent lamps. It would be obvious to those skilled in the art that other forms of light source may be employed as well as other types of photosensitive devices.

Referring now to the partial schematic circuit diagram of the present invention, light source LS1 as will be noted provideslight when a tape window or a reflective surface of the tape is properly located to cause operation of light sensitive diode LR1 whose output will be amplified to provide an operating signal for relay K1. Likewise light source LS2 provides the operating illumination for light sensitive diode LR2 whose output is amplified to operate K2. Also shown is relay K3 which operates a midcycle motor B1 which provides the rotational force for the present tape device, a variable resistor R1 utilized to reduce the voltage for operation of motor B1 to reduce its speed during the record operation and a switch S1 which may be manually or automatically operated. Switch S1 in most instances would probably be automatically operated in response to incoming telephone calls. Also shown as a box C1 inasmuch as it does not form a part of the present invention, is a midcycle circuit associated with the present device which will provide the necessary midcycle functions of starting the incoming tape recording electronics, etc.

Referring to the above drawings now in combination, a description of the operation of the present invention is as follows:

Assume that tape TP1 is properly positioned on the device and that its reflective surface located on the lower edge of the tape as may be seen in reference to FIG. 3A will cause an output from light sensitive device LR1 which will cause operation of relay K1. Since relay K1 is operated at its contacts K1A the normal operating path for motor B1 is open and the device is at a rest. Assume now that switch S1 (which may be operated in any conventional manner, probably from the incoming telephone signal), is operated, power will be supplied from a DC power source to motor B1 causing it to operate and advance the tape TP1. As the reflective segment of the tape advances so that light is no longer reflected on light sensitive diode LR1 relay K1 will restore and at contacts K1A an operating path will be maintained for motor B1 even though a switch S1 may have been restored.

The tape now and in response to drive from capstan C will make one complete revolution but because of the 180° twist occurring in the tape, the light reflective surface or transparent segment will now be positioned in the upper portion of the tape as may be noted by reference to FIG. 3B so that light from light source LS2 is reflected on light sensitive device LR2. When light is reflected onto the light sensitive device LR2, an output will be generated, then amplified by amplifier A2 to cause operation of relay K2. Operation of relay K2 at contacts K2A completes an operating path for relay K3.

Relay K3 now operates and locks at contacts K3A to an operating path to battery so that as the tape advances past the area where the reflective surface is located, and relay K2 restores relay K3 will stay operated. At contacts K3B a short that previously existed around variable resistor R1 will be removed placing variable resistor R1 in the operating circuit of motor B1. As noted previously the variable resistor will reduce the voltage supply to the motor below the normal governed range to provide an increased time duration for the cycle of revolution associated with this the incoming portion of the message recording. When relay K3 also operated at its contacts K3C an operating path is provided to the midcycle circuit to provide such additional control signals as may be required.

The tape now advances at a reduced speed because of the introduction of variable resistor R1 in the operating circuit of motor B1. At such time as the loop completes one more entire revolution, the reflective surface will again be at the lower portion of tape TP1 and light from light source LS1 will be reflected on light sensitive diode LR1 whose output will cause operation of relay K1, which at its associated contacts K1A will open the operating path for both motor B1 causing it to stop and for relay K3 causing it to restore. In this manner, two complete revolutions of the tape will have taken place, the second at a speed reduced from that of the first to increase the recording time available for incoming messages.

It will be obvious to those skilled in the art that numerous modifications of the present invention may be made without departing from the spirit and scope of the present invention which shall be limited only by the scope of the claims appended hereto.

What is claimed is:

1. A magnetic record and playback device including, tape drive means operable at a plurality of speeds, switching means operable to render said tape drive means operated at a first speed, a two-sided magnetic recording tape loop formed of a continuous strip with ends joined and having a 180° twist in the loop when disposed in the assembled configuration on said drive means, the improvement comprising: first and second light conditioning segments included in said tape; first and second light sources; first light responsive means operated in response to positioning of said first light conditioning segment of said tape proximal to said first source; said first light responsive means including a light sensitive device and relay means, said light sensitive device operated in response to light from said first light source conditioned by said first light conditioning segment, to operate said relay means to render said tape drive means inoperable; and second light responsive means operated in response to positioning of said second light conditioning segment of said tape proximal to said second light source; said second light responsive means including a light sensitive device and relay means, said light sensitive device operated in response to light from said second light source conditioned by said second light conditioning segment, to operate said relay means to render said tape drive means operable at a second speed.

2. A magnetic record and playback device as claimed in claim 1, wherein: said first and second light conditioning segments are of light reflective material.

3. A magnetic record and playback device as claimed in claim 1, wherein: said first and second light conditioning segments are of light conductive material.

4. A magnetic record and playback device as claimed in claim 3, wherein: said first and second light conditioning segments are combined as a single segment of light conductive material.

5. A magnetic record and playback device as claimed in claim 1, wherein: said first and second light responsive means each include a photosensitive diode.

6. A magnetic record and playback device as claimed in claim 2, wherein: said light sensitive device is operated in response to light from said first light source reflected by said light reflective material in said first light conditioning segment, to operate said relay means to render said tape drive means inoperable.

7. A magnetic record and playback device as claimed in claim 3, wherein: said light sensitive device is operated in response to light from said first light source conducted through said light conductive material of said first light conditioning segment to operate said relay means to render said tape drive means inoperable.

8. A magnetic record and playback device as claimed in claim 2, wherein: said light sensitive device is operated in response to light from said second light source reflected by the light reflective material of said second light conditioning segment, to operate said relay means to render said tape drive means operable at said second speed.

9. A magnetic record and playback device as claimed in claim 3, wherein: said light sensitive device is operated in response to light from said second light source conducted through said light conductive material portions of said second second light conditioning segment to operate said relay means to render said tape drive means operable at said second speed.

10. A magnetic record and playback device as claimed in claim 8, wherein: said relay means comprise first and second relays, said first relay operated in response to said light responsive device and said second relay operated in response to said first relay.

11. A magnetic record and playback device as claimed in claim 9, wherein: said relay means comprise first and second relays, said first relay operated in response to said light sensitive device and said second relay operated in response to operation of said first relay.

* * * * *